May 2, 1933. H. F. HITNER 1,906,594
PROCESS AND APPARATUS FOR MELTING GLASS BY ELECTRICITY
Filed Aug. 26, 1931

INVENTOR
Harry F. Hitner
by
Bradley & Bee
attys.

Patented May 2, 1933

1,906,594

UNITED STATES PATENT OFFICE

HARRY F. HITNER, OF OAKMONT, PENNSYLVANIA, ASSIGNOR TO PITTSBURGH PLATE GLASS COMPANY, A CORPORATION OF PENNSYLVANIA

PROCESS AND APPARATUS FOR MELTING GLASS BY ELECTRICITY

Application filed August 26, 1931. Serial No. 559,409.

Figure 1:
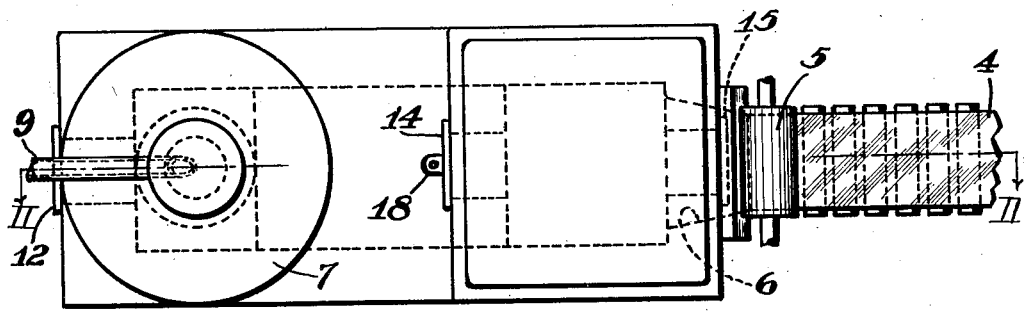
Figure 2:
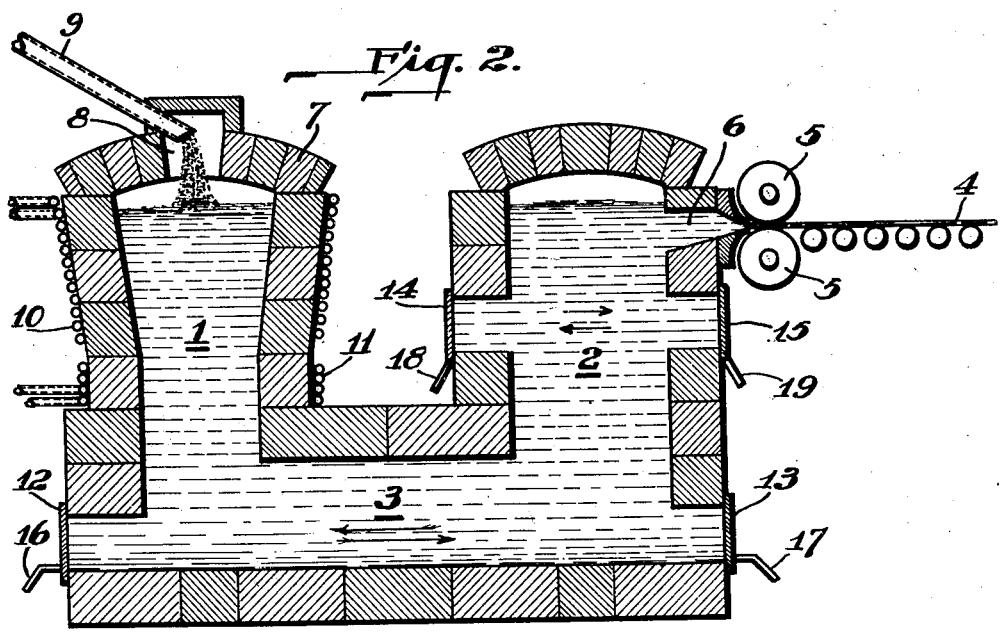

The invention relates to the melting of glass by electricity and has for its objects the provision of an improved process and apparatus, wherein: (1) a very rapid melting of the glass is secured with a complete separation of the reduced and finished glass from the unfinished glass, (2) a circulation of glass is secured which tends to keep the batch away from the side walls of the melting chamber and reduce the erosion thereof, so that a maximum life of the refractory material for said walls is secured, and (3) the temperature of the finished glass may be closely and easily regulated during the period between the production of the finished glass and its discharge from the furnace. One embodiment of the invention is illustrated in the accompanying drawing, wherein:

Figure 1 is a plan view and Fig. 2 is a section on the line II—II of Fig. 1.

The apparatus shown comprises a vertical melting chamber 1, circular in cross section, and a second chamber 2, preferably rectangular in cross section, and a connecting throat portion 3, the walls of the tank throughout being composed of the usual refractory material employed in the construction of glass melting tanks, such as clay. As shown, the glass is withdrawn from the chamber 2 in the form of a sheet 4 passing between suitable water cooled rolls 5, 5 spaced opposite the outlet opening 6. It will be understood, however, that the glass melted in the tank or furnace may be utilized in any desired way, the invention relating more particularly to the construction of the melting chamber 1.

It will be understood that the tank and associated apparatus is suitable for the reduction of vitreous products other than those commonly referred to as glass, such as the vitreous enamels which are a species of glass and silicate of soda which is sometimes referred to as soluble glass. The term "glass", therefore, is used in its broad sense and the furnace is not limited to the use of melting of the ordinary forms of glass.

The chamber 1 is provided at its top with an arch or cover 7 having an opening 8 through its center to which batch is supplied through the trough or conduit 9. Heat is supplied to melt the batch in the melting chamber by means of induction coils 10, 11 connected to a source of high frequency current. These coils are preferably in the form of pipes through which water is supplied in order to cool them, this being a well known construction in induction furnaces. Two coils 10 and 11 are preferably employed in order to secure a heat regulation which is different in the upper and lower parts of the furnace, the upper portion of the furnace being preferably heated to a greater extent than the lower portion. The passage of the high frequency current through the coils 10 and 11 induces currents through the body of the material in the melting chamber and such material is heated to any desired temperature, preferably about 2700 degrees F. in the upper portion of the chamber and 2600 degrees F. in the lower portion. The current induced in the glass heats the glass next to the walls of the chamber to a greater extent than that at the central portion of the chamber which tends to induce a circulation in the chamber which is downward at the central portion thereof and upward along the walls. This tends to speed up the reduction of the batch due to the downward flow of the glass at the center to which the batch is supplied. The walls of the circular chamber 1 are preferably flared outwardly, as indicated in Fig. 2, to reduce the eroding effect of the glass thereon as it flows upward through the chamber adjacent the sides. The upper portion of the chamber is heated to a greater degree than the lower portion in order to facilitate the rapid reduction of the batch.

In order to still further regulate the temperature of the finished glass, the tank or furnace is provided with two sets of electrodes 12, 13 and 14, 15. These electrodes are in the form of plates made of refractory material, such as nickel chromium, to which the leads 16, 17 and 18, 19 leading to a suitable source of alternating current are connected. By this means, the melted glass in the tank may be maintained at any desired temperature due to the heat generated by the passage of the electric current therethrough.

What I claim is:

1. In combination in an electric furnace for making glass, a vertical melting chamber having an enlargement at its lower end and its walls flaring outwardly thereabove, means for supplying batch to the upper end of the chamber, means for withdrawing glass from the lower end of the chamber, an induction coil having its axis vertical surrounding the flaring walls of the chamber, and means for supplying high frequency electric current to the coil.

2. In combination in an electric furnace for making glass, a vertical melting chamber having its walls flaring outwardly from its lower portion up, means for supplying batch to the upper end of the chamber centrally thereof, means for withdrawing glass from the lower end of the chamber, an induction coil having its axis vertical surrounding the flaring walls of the chamber, and means for supplying high frequency electric current to the coil.

3. A process of melting glass, which consists in maintaining a body of molten glass of substantial depth, inducing a flow of electric current through said body so as to heat the glass to a greater extent at the outer portions of the body than at the center thereof, supplying batch to the upper end of said body at the central portion thereof and withdrawing glass from the lower end of such body.

4. A process of melting glass, which consists in maintaining a body of molten glass of substantial depth, inducing a flow of electric current through said body so as to heat the glass in the upper portion of said body to a greater extent than in the lower portion of said body and so as to cause a downflow of glass at the center portion of said body and an upflow at the outer portions of the body surrounding said center portion and supplying batch to the upper portion of said body at the central portion thereof.

In testimony whereof, I have hereunto subscribed my name this 18th day of August, 1931.

HARRY F. HITNER.